(12) United States Patent
Brenner et al.

(10) Patent No.: US 12,339,976 B2
(45) Date of Patent: *Jun. 24, 2025

(54) ENCRYPTION KEY MANAGEMENT USING CONTENT-BASED DATASETS

(71) Applicant: Dell Products L.P., Round Rock, TX (US)

(72) Inventors: Adam Brenner, Mission Viejo, CA (US); Jehuda Shemer, Kfar Saba (IL); Steven Sadhwani, Round Rock, TX (US); Valerie Lotosh, Ramat-Gan (IL); Erez Sharvit, Ramat-Gan (IL)

(73) Assignee: Dell Products L.P., Round Rock, TX (US)

( * ) Notice: Subject to any disclaimer, the term of this patent is extended or adjusted under 35 U.S.C. 154(b) by 221 days.

This patent is subject to a terminal disclaimer.

(21) Appl. No.: 17/975,505

(22) Filed: Oct. 27, 2022

(65) Prior Publication Data

US 2024/0143789 A1    May 2, 2024

(51) Int. Cl.
  *G06F 21/60*   (2013.01)
  *G06F 21/10*   (2013.01)
  *G06F 21/62*   (2013.01)

(52) U.S. Cl.
  CPC ........ *G06F 21/602* (2013.01); *G06F 21/6218* (2013.01); *G06F 21/107* (2023.08)

(58) Field of Classification Search
  CPC .. G06F 21/6218; G06F 21/52; G06F 12/0875; G06F 12/1408; G06F 12/1458; G06F 15/78; G06F 16/23; G06F 2212/1052; G06F 2212/402; G06F 2212/452; G06F 9/30072; G06F 9/30098; G06F 9/30101; G06F 9/3867; G06F 11/1076; G06F 21/602; G06F 11/073; G06F 21/62; G06F 2211/1028; G06F 21/44; G06F 21/53; G06F 21/554; G06F 16/1834; G06F 21/566; G06F 21/606; G06F 9/45558; G06F 16/1824; G06F 2009/45587; G06F 11/3006; G06F 11/3034; G06F 11/3409; G06F 11/3485; G06F 21/105; G06F 21/33;

(Continued)

(56) References Cited

U.S. PATENT DOCUMENTS 7,158,994 B1   1/2007  Smith
2004/0044891 A1*  3/2004  Hanzlik ................ H04L 63/065
                                                                    713/150

(Continued)

*Primary Examiner* — Djenane M Bayard
(74) *Attorney, Agent, or Firm* — Staniford Tomita LLP

(57) ABSTRACT

Providing content-based encryption to content data in a data processing system by creating datasets by grouping metadata for data objects that are intended to be encrypted with a common encryption key, where each dataset spans multiple storage devices of different storage types, and defines a single data encryption unit for the data objects referenced by a respective dataset. Each dataset is tagged with an encryption tag to enable or disable use of a self-selected encryption key. Encryption keys stored in or made available to the system are accessed for encrypting the data objects using an encryption process. A key management component maps each dataset to a corresponding encryption key of the encryption keys, and an encryption component encrypts, for each dataset, referenced data objects using a corresponding mapped encryption key.

20 Claims, 12 Drawing Sheets

(58) Field of Classification Search
CPC ......... G06F 21/6209; G06F 2221/2129; G06F 3/0683; G06F 21/57; G06F 21/604; G06F 21/6227; G06F 21/6245; G06F 21/34; G06F 21/64; G06F 21/6254; G06F 21/31; G06F 21/32; G06F 21/80; G06F 21/85; G06F 21/1073; G06F 21/1075; G06F 21/1077; G06F 21/51; G06F 21/575; G06F 21/72; G06F 21/74; G06F 21/78; G06F 21/82; G06F 21/107; G06F 21/121; G06F 21/16; G06F 21/445

See application file for complete search history.

(56) References Cited

U.S. PATENT DOCUMENTS

| | | |
|---|---|---|
| 2011/0093471 A1 | 4/2011 | Brockway |
| 2011/0164752 A1* | 7/2011 | Wainner ................ H04L 63/104 |
| | | 709/224 |
| 2012/0109958 A1 | 5/2012 | Thakur |
| 2014/0289202 A1 | 9/2014 | Chan |
| 2016/0188647 A1* | 6/2016 | Chang .................... G06F 16/122 |
| | | 707/805 |
| 2018/0027006 A1 | 1/2018 | Zimmermann |
| 2018/0225177 A1 | 6/2018 | Bhagi |
| 2019/0182294 A1 | 6/2019 | Rieke |
| 2019/0272335 A1 | 7/2019 | Liu |
| 2019/0318102 A1* | 10/2019 | Araya .................... H04L 9/0897 |
| 2020/0133781 A1 | 4/2020 | Reddy Av |
| 2021/0240659 A1 | 4/2021 | Wee |
| 2021/0165782 A1 | 6/2021 | Deshpande |
| 2022/0012251 A1 | 1/2022 | Colcord |
| 2022/0094530 A1* | 3/2022 | Sreeravindra ......... H04L 9/0861 |
| 2022/0318421 A1 | 10/2022 | Berube |
| 2022/0335340 A1 | 10/2022 | Moustafa |
| 2022/0385459 A1* | 12/2022 | Thomsen .............. H04L 9/0643 |
| 2023/0079486 A1 | 2/2023 | Yallagadda |
| 2024/0054236 A1* | 2/2024 | Moyal .................... G06F 21/602 |

\* cited by examiner

900

```
┌─────────────────────────────────────────────────┐
│ Define a Protection Policy to Protect Certain Data stored │
│ in different storage devices and/or network environments │
│                       902                       │
└─────────────────────────────────────────────────┘
                         ↓
┌─────────────────────────────────────────────────┐
│   Gather metadata of data objects to be protected │
│                       904                       │
└─────────────────────────────────────────────────┘
                         ↓
┌─────────────────────────────────────────────────┐
│         Store gathered metadata in a Catalog    │
│                       906                       │
└─────────────────────────────────────────────────┘
                         ↓
┌─────────────────────────────────────────────────┐
│  Run a Query against the Catalog to generate a dataset │
│  comprising metadata selectors as tags for matching │
│                 cataloged metadata              │
│                       908                       │
└─────────────────────────────────────────────────┘
                         ↓
┌─────────────────────────────────────────────────┐
│  Apply the Defined Protection Policy to the Dataset to │
│        protect corresponding content data       │
│                       910                       │
└─────────────────────────────────────────────────┘
```

FIG. 9

ENCRYPTION KEY MANAGEMENT USING CONTENT-BASED DATASETS

TECHNICAL FIELD

Embodiments are generally directed to large-scale data storage systems and more specifically to implementing encryption key management using content-based datasets.

BACKGROUND

Enterprise data is scaling to extreme sizes in present business ecosystems. Users have traditionally relied on a single person or a small team of people to understand and manage all the data for a company. In the context of data protection, this would be the backup administrator or system admin team. Backup administrators would work with data owners who produce and consume the data, and would create lifecycle policies on the data so that data would be backed up, restored, moved, or deleted according known rules. These rules or policies could be anything from when to tier, archive, backup and delete the data, in accordance with appropriate company and legal requirements.

As the sheer amount of data has grown, however, such users have had to change their operating models. Having a single person or team simply cannot scale to handle these increases. They thus must choose among a few options to keep up the increase in data, such as grow the team, invest in automation, and/or move the responsibilities of data management to the creators of the data, while overseeing compliance. While the operating model has changed, one element has not changed, and that is that lifecycle rules are very data specific. This means that the person creating the lifecycle rules has to know where the data exists, who created the data, and for how long the data needs to be saved.

Present methods of handling the management of data lifecycles in the context of very large and dynamic datasets are simply unable to keep up with ever increasing management demands, such as when the incoming rate of data exceeds the capacity to manage the data lifecycles. For example, it is forecasted that volumes of unstructured data in enterprise environments will grow to exabyte scales in the future. This explosive growth in data will not come from a single source or process, but will instead come from many areas within a user environment, such as core networks, edge devices, public/cloud networks, and so on. Moreover, data will be generated by automated processes and consumed by other processes and due to the size, volume and variety of data.

Present large-scale data systems impose an ever-increasing need to secure data access. It is often critically necessary to ensure that data is secure throughout its lifecycle from on-disk storage to in-memory access. It is also necessary to ensure that valuable and sensitive data is encrypted and secure to prevent any unwanted access or theft of such data. Current key-based encryption systems encode the data such that it can only be accessed or decrypted by a user with the correct encryption key. Key-based encryption can be symmetric where one secret key is used to both encode and decode the data, or asymmetric where encryption key is done using a public key and decryption is done using a private key.

In present systems, encryption at rest is done on an all-or-nothing basis, that is, all data is encrypted with same key or no key at all. However, depending on data attributes, different sets of data may prefer or benefit from using a different encryption key from other data, for example MS-Office documents versus photos versus medical records, and so on, may better encrypted with different keys. It would also be beneficial if the rotation and lifecycle of each key was independent of each other encryption key for other sets of data.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 9 is a flowchart illustrating a method of managing datasets lifecycles, under some embodiments.

DETAILED DESCRIPTION

Figure 1:
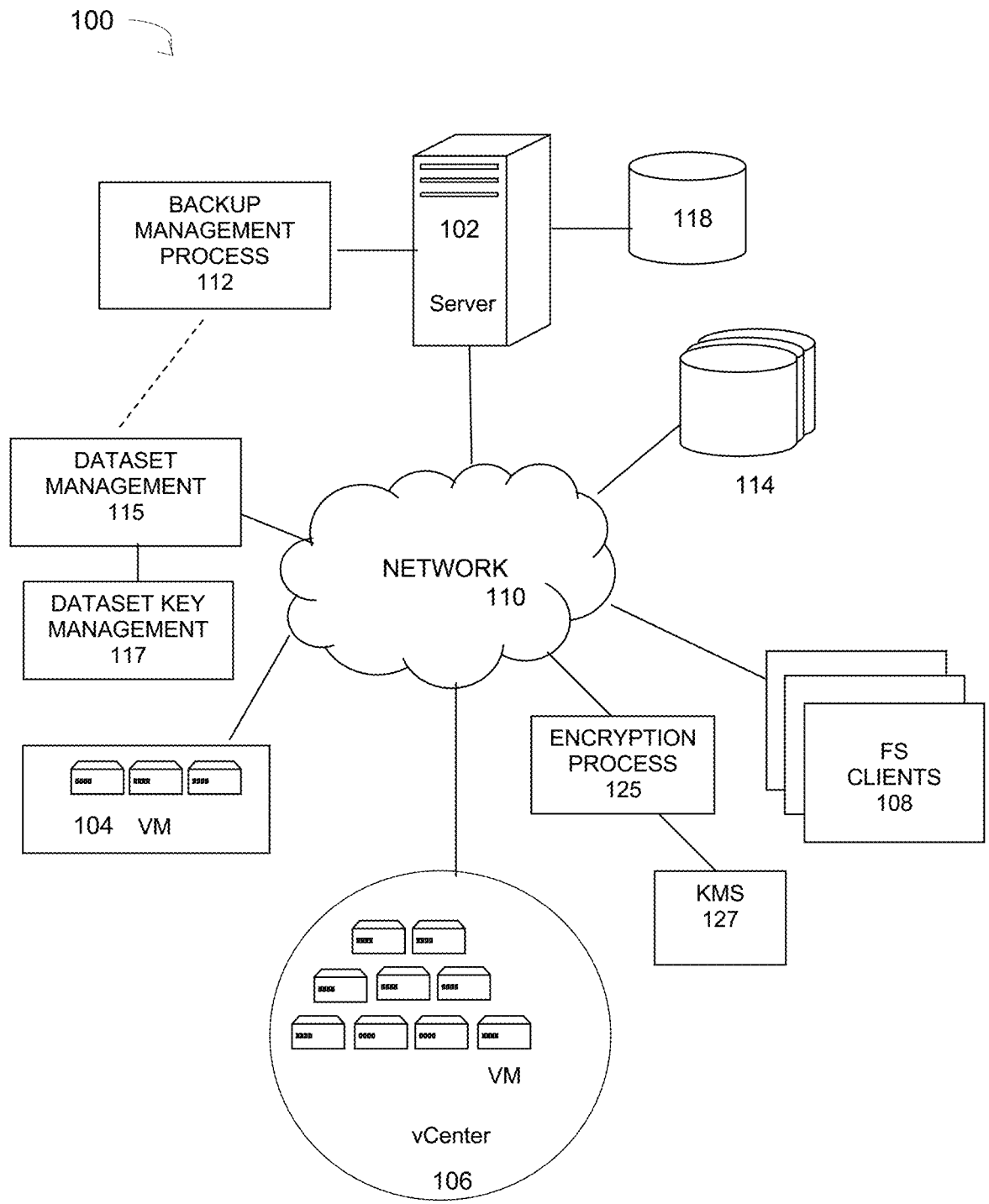
FIG. 1 is a diagram of a large-scale network implementing a large-scale dataset management process for content-based data protection, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated data storage techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more processes and components for managing the lifecycles of large-scale datasets, under some embodiments. The term 'lifecycle' refers to the different stages data as it goes from creation to ultimate deletion. In general, when data is first created, it is actually or at least assumed to be more active, more important, higher priority, etc. As data ages, however, files and documents usually become less important, or maybe at least less frequently accessed or current. For example, with respect to data protection systems, data that was created and backed up five years ago is generally treated as less important than data created the previous day.

As shown in FIG. 1, system 100 includes a network server computer 102 coupled directly or indirectly to the target VMs 106, and to data sources 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data sourced by system 100 may be stored in any number of other storage locations and devices, such as local client storage, server storage (e.g., 118), or network storage (e.g., 114), which may at least be partially implemented through storage device arrays, such as RAID components. The storage 114 may represent Network Attached Storage (NAS), which is generally dedicated file storage that enables multiple users and heterogeneous client devices to retrieve data from a centralized disk. Users on a local area network (LAN) can access the shared storage via a standard Ethernet connection. Other similar systems may also be used to implement an NAS resource.

Embodiments can be used in a physical storage environment, a virtual storage environment, or a mix of both, running a deduplicated backup program. In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as file system (FS) clients 108, or other backup clients. Other data sources having data to be protected and backed up may include other VMs 104. The data sourced by the data source may be any appropriate type of data, such as database data that is part of a database management system.

In this case, the data may reside on one or more storage devices of the system, and may be stored in the database in a variety of formats.

In system 100, server 102 executes a data storage or backup management process 112 that coordinates or manages the backup of data from one or more data sources 120 to storage devices, such as network storage 114, client storage, and/or virtual storage devices 104. The data sourced by the data source may be any appropriate data, such as database data that is part of a database management system, and the data may reside on one or more hard drives for the database(s) in a variety of formats. In an embodiment, the backup process 112 uses certain known full and incremental (or differencing) backup techniques along with a snapshot backup process that is used to store an image or images of the system(s) to be backed up prior to the full or incremental backup operations.

In an embodiment, the network system 100 may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, the server 102 may be implemented as a DDR Deduplication Storage server provided by DellEMC Corporation. However, other similar backup and storage systems are also possible. In a general implementation, a number of different users (or subscribers) may use backup management process to back up their data on a regular basis to virtual or physical storage media for purposes of data protection. The saved datasets can then be used in data restore operations to restore any data that may be lost or compromised due to system failure or attack.

In an embodiment, system 100 may represent part of a Data Domain Restorer (DDR)-based deduplication storage system, and server 102 may be implemented as a DDR Deduplication Storage server provided by DellEMC Corporation. However, other similar data storage systems are also possible. A deduplication storage system generally represents a single-instance storage system in which redundant copies of data are eliminated to reduce storage overhead. Redundant data blocks are replaced with a pointer to the unique data copy so that only one unique instance of data is stored on the storage media (e.g., flash memory, disk, tape, etc.).

The data protection server 102 executes backup and recovery software that are crucial for enterprise-level network clients. Users rely on backup systems to efficiently back up and recover data in the event of user error, data loss, system outages, hardware failure, or other catastrophic events to allow business applications to remain in service or quickly come back up to service after a failure condition or an outage. Secure and reliable backup processes form the basis for many information technology (IT) services. Large-scale data storage networks rely on periodic or continuous data protection (CDP) methods using snapshot copies to automatically save copies of changes made to the data. This allows the network to capture earlier versions of the data that the user saves, thus providing the ability to restore data to any point in time in the event of hardware failure, system outages, and other significant disruptive events.

Embodiments of process 115 provide lifecycle management for datasets, and typically large-scale datasets. Essentially, datasets are a logical grouping of files, objects or both that exists anywhere in a user environment. A dataset is a logical collection of metadata for unstructured files and objects that are grouped together by one or more filters from a data query in a catalog. Examples of datasets include: all the x-ray images produced in the last 24 hours, sensor data from a particular facility, all the files in a subfolder on a NAS device, all office documents that exists on NAS and object storage, and so on. Datasets can thus be organized by data location, age, type, ownership, and so on, or any combination of such factors. A single dataset can span multiple storage devices, such as NAS and object storage. Additionally, datasets can span multiple operating environments like edge and core devices, and private, public, and cloud networks.

As used herein, the term metadata generally means a set of information that describes or provides information about other data. Metadata describes the actual content or file data, such as by specifying the file name, file type, file location, and so on. Metadata is generally many orders smaller than the content data (which can be huge depending on the application generating the file), and uniquely identifies the file comprising the content data, thus providing an efficient way to catalog, index, and otherwise process the file containing the content data.

As stated above, data protection systems (e.g., Avamar, Networker and PowerProtect Data Manager from DellEMC) require a user to create a protection policy that protects all or part of one or more data assets. By protecting assets, this allows data protection products to backup and restore the assets, which in turn offer protection and recovery of data on the assets. This model of protecting assets works well when users always know where their data is located. However, if the data is spread across many different assets, current data protection products struggle to adequately protect the data in these cases. Embodiments of process 115 provide the ability to group and protect data as one unit, regardless of where or how many assets they are located on. This is performed by the concept of datasets that are used in protection policies instead of assets. The result is that protection policies are composed of datasets which capture what the data is versus where it is. This simplifies the protection model by protecting data based on data types so that projects dispersed many multiple filesystems, storages, object stores, etc. may be dealt with as a single protection construct, i.e., the 'dataset.' Moreover, the dataset automatically tracks project data added, removed or relocated and so data protection will always be up to date on asset location changes even in the largest systems. In other words, datasets define content-based data protection as opposed to the location-based schemas of present systems.

In an embodiment, the data queries can be processed by a search engine process that is utilized to submit queries through a server (e.g., server 102) to the various data sources. Such a search engine examines a body of data in a systematic way for particular information specified in a textual search query input by a user. The body of data may be private corporate data or public data, such a web search. The search engine may employ one or more indexing schemes that associate words and other definable tokens to location or storage information (e.g., associating web pages to their domain names and HTML-based fields). A query from a user can be a single word, multiple words or a sentence, and the index helps find information relating to the query as quickly as possible. A user generally enters a query into the search engine as one or more keywords, and the index already has the names of the sites or locations containing the keywords, and these are instantly returned in response to the query from the index. If more than one response is returned for a query, they can be ranked in order of most to least relevant to the query based on number or closeness of keyword matches, and so on. The search engine may be a component within the server 102, or it may be provided as separate functional components in system 100, or as a cloud-based service, and so on.

Figure 2:
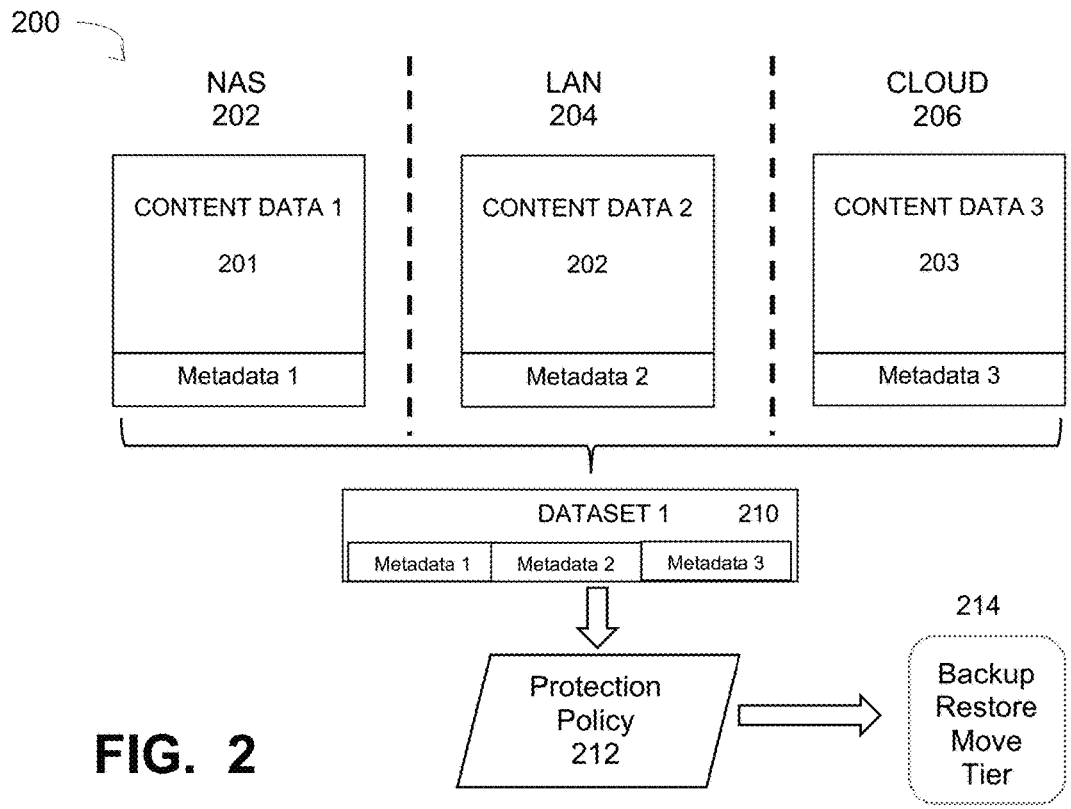
FIG. 2 illustrates creating datasets from metadata for unstructured files and objects, under some embodiments.

FIG. 2 illustrates creating datasets from metadata for unstructured files and objects, under some embodiments. As shown in FIG. 2, system 200 comprises three different example storage environments, such as NAS storage network 202, local (LAN) storage network 204, and cloud storage 206. Each of these storage locations can be used to store content data for a user or organization. For the example shown, content data 1 (201) may represent files and data objects stored by the user in NAS 202, content data 2 (202) may represent files and data objects stored by the user in local storage 204, and content data 3 (203) may represent files and data objects stored by the user in cloud 206. As can be seen in FIG. 2, each set of content data has associated metadata that provides information about the content data.

The content data in each or any of the storage locations typically comprises unstructured data, which is data that is not organized according to a preset data model or schema, and therefore cannot be stored in a traditional relational database or RDBMS. Examples of unstructured data include text, multimedia files, email messages, audio/visual files, web pages, business documents, and so on. The data may also comprise structured data that can be stored in one or more databases.

In an embodiment, the respective content data in each storage system is intended to be protected in the same manner, such as protecting the data as a single unit or through the same protection policy. In this case, the metadata for each storage type, e.g., Metadata 1, Metadata 2, and Metadata 3, are combined to form a single dataset, 210. A single or common protection policy 212 is then applied to the dataset 210 so that the content data referenced by the respective metadata is processed by the appropriate protection operation 214, such as backup, restore, move, tier, and so on.

Figure 3:
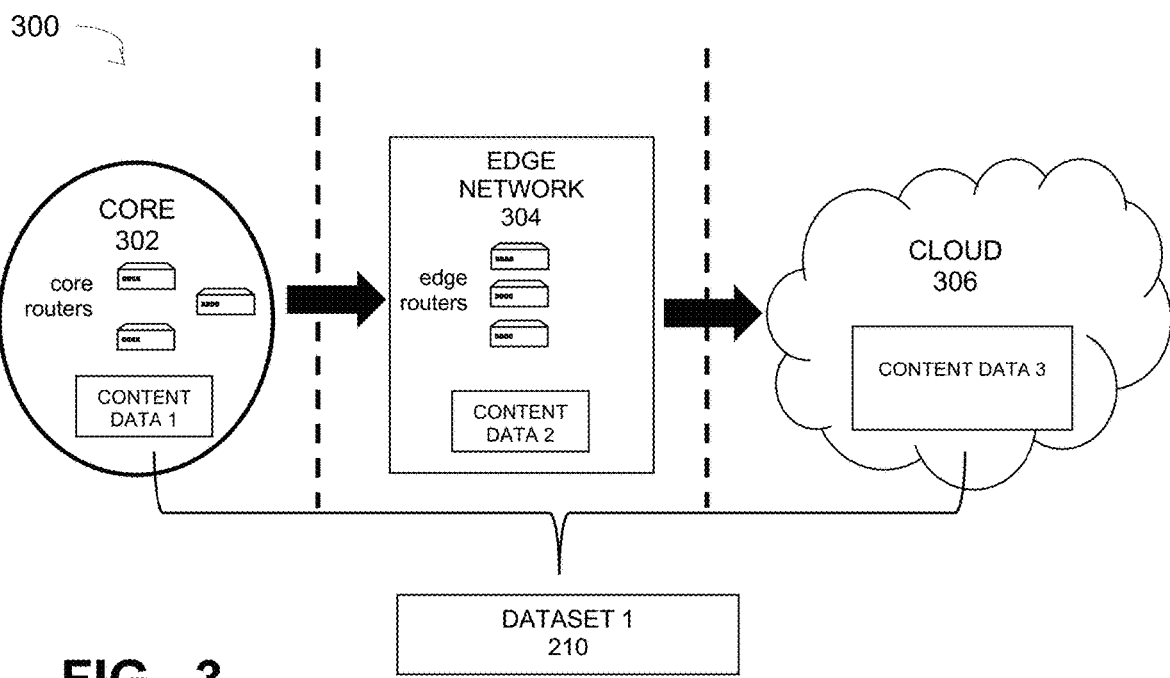
FIG. 3 illustrates data residing among different operating environments processed as a single dataset, under some embodiments.

FIG. 2 thus illustrates an embodiment in which a single dataset can span multiple storage devices and storage types. Such datasets can also span multiple operating or network environments. FIG. 3 illustrates data residing among different operating environments processed as a single dataset, under some embodiments. As shown in FIG. 3, system 300 comprises a core network 302 coupled to the public cloud 306 through an edge network 304. The core network 302 is the backbone or main network in an organization, and may be implemented as a datacenter (e.g., 106) or set of LAN/WAN networks through core routers. The edge network 304 contains edge routers that connect the core network 302 to cloud 306 or public networks (as shown), or to other core networks, or any other intra- or inter-network connection, as needed. For the example of FIG. 3, each network may store the content data illustrated in FIG. 2. Thus, content data 1 may be stored in core network storage, content data 2 may be stored in the edge network, and content data 3 may be stored in the cloud, for example. The metadata for these respective content data elements is grouped together and organized as dataset 1, 210 as shown in both FIGS. 2 and 3.

It should be noted that embodiments illustrated in FIGS. 2 and 3 are intended to be illustrative only, and any amount of data of any type may be stored in any of the storage types or network systems shown in FIGS. 2 and 3, or other similar storage and network systems.

As shown in FIGS. 2 and 3, a dataset 210 is formed from metadata to represent content data stored in different storage device and network environments to form a single data element that is protected by a protection policy. In this manner, data is protected based on what it is rather than where it is, as data spread across devices and networks can be treated as a unitary dataset for purposes of applying specific protection policies, thus providing content-based data protection for defined datasets.

In an embodiment, the data objects are independent between themselves and from the dataset. That is, the objects are edited or changed independently, and at some point an initial or revised version of the dataset is created at which point it captures the state of all the data objects it references.

Figure 4:
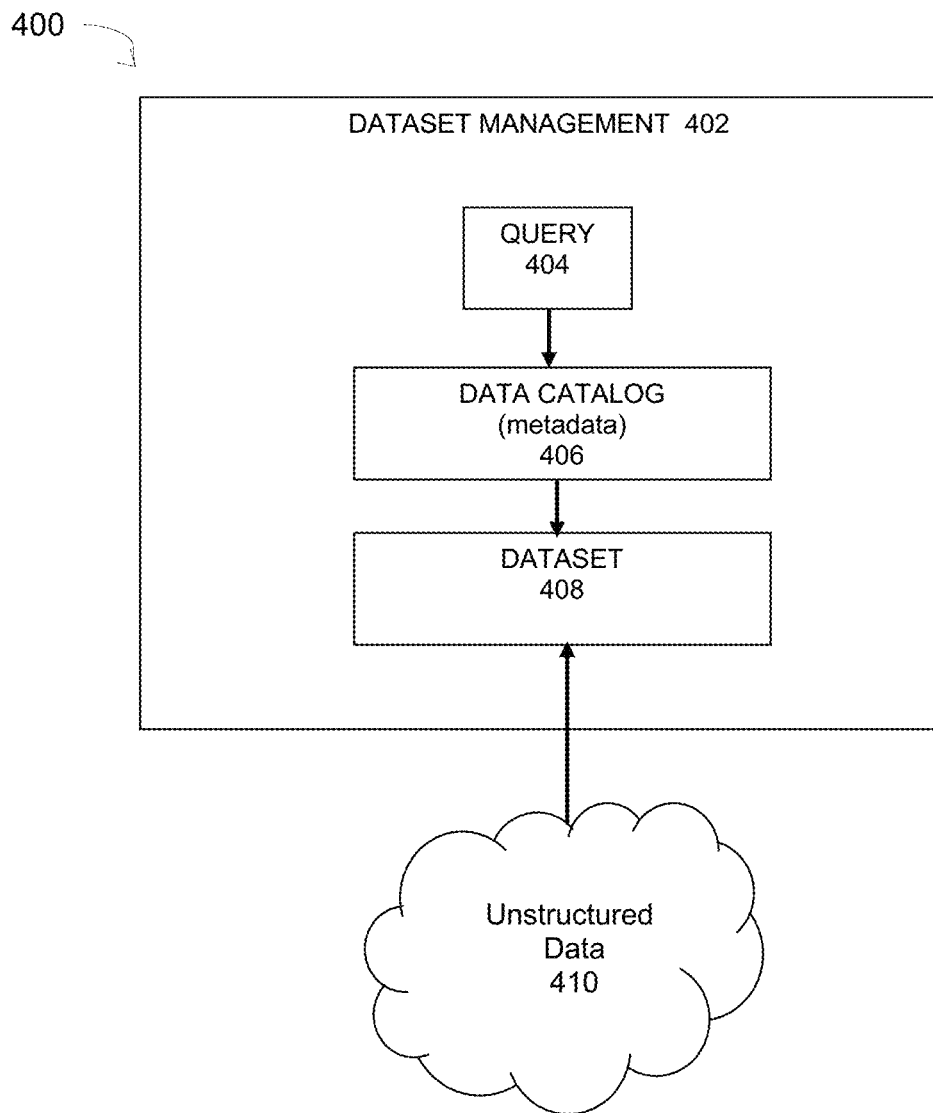
FIG. 4 is a diagram illustrating components of the dataset management processing component, under some embodiments.

FIG. 4 is a diagram 400 illustrating components of the dataset management processing component 115, under some embodiments. As shown in FIG. 4, the dataset management system 402 includes the three main components of a dataset 408, a data catalog 406, and a query 404. This system can access any unstructured data 410 stored in one or more unstructured data storage devices, such as Dell PowerScale, Elastic Cloud Storage (ECS), and similar storage devices. Metadata information from the unstructured data 410 can be captured from a data access product (e.g., Dell's DataIQ), which captures metadata information from unstructured storage devices 410.

DataIQ represents an example of a storage monitoring and dataset management software for unstructured data that provides a unified file system view of PowerScale, ECS, third-party platforms and the cloud, and delivers unique insights into data usage and storage system health. It also allows organizations to identify, classify, search and mobilize data between heterogeneous storage systems and the cloud on-demand, such as by providing features such as: high speed scan, indexing and search capabilities across heterogeneous systems, reporting on data usage, user access patterns, performance bottlenecks and more, and supporting data tagging and precision data mover capabilities. Although embodiments are described with respect to DataIQ management software, embodiments are not so limited, and any similar process for capturing metadata information from unstructured data and data storage may be used.

For purposes of the present description, the term 'DataIQ' refers to a product that represents a type of data catalog. It has and uses multiple databases (e.g., NoSQL databases and document stores) that hold metadata about files from NAS and object storage. It also includes components that scan the data for discovery and metadata extraction. Such a product can also include a component that connects to the DataIQ catalog (i.e., database) and presents a UI to the user. This includes being able to perform searches for files, show trends, storage usage, storage health, and so on. For purposes of the present description, the term DataIQ may be referred to as a 'scanning data catalog' or more simply as a 'data catalog.'

A dataset 408 is logical collection of metadata for unstructured files and objects that are grouped together by one or more filters from a data query 404 in a catalog 406. Datasets represent a subset of data that a user categorizes for specific needs. Actions performed on a dataset will affect only the underlying data it references. A single dataset can span multiple storage devices, such as NAS and object storage. Additionally, datasets can span multiple operating environments like edge devices, core devices, and cloud networks (as shown in FIG. 3).

In an embodiment, the data catalog 406 is a data element or technical framework that stores the dataset or datasets, and may embody a DataIQ data catalog or similar scanning data catalog. In general, a data catalog can be embodied as a simple database, or a database comprises of multiple tables or databases of different types, such as NoSQL databases, SQL databases, document stores, relational databases, and so on. The data consumed and used in a data catalog might be specific to one or more of those specific database types. Alternatively, the data catalog may also include a front-end interface (e.g., GUI) to different database applications or types for management, searches, and so on.

The data catalog 406 does not store the content data itself but rather metadata or pointers to the data. For example, there may be 1,000 movie files with each movie file being 10 GB in size. In this case, the data catalog will have 1,000 entries of just the metadata for those files. Such metadata comprises information that uniquely identifies the corresponding movie (or other content data), such as file name, file size, file location, file creation date/time, file update time, file permissions/ACL, and so on. Such metadata may also include additional information also stored in the data catalog specific to each file type. For example, the metadata for movies could also contain the resolution, the camera that was used, codec for audio or video, the stars in the movie, who directed it, and so on.

Datasets 408 are generated when data queries 404 are run on or executed against the metadata in a data catalog 406. Data queries 404 are the metadata-based queries that run against the data catalog, generating a dataset 408 as a result. The metadata selectors can vary from creation/modification timestamps, file size, file location (e.g., volume where the data resides), tags, or any other appropriate identifier. For this embodiment, tags are simple string values that are automatically generated and applied to files/folders in a filesystem or object storage based on user-defined rules. They are completely customizable, and these tagging rules can be specified by naming conventions of the file or file path, or something more advanced, such as results from AI/ML algorithms running against the file's contents (e.g., ImageRecognition for medical images).

In an embodiment, the tags represent a crucial piece of metadata, because they define 'what' the data is. Given that these tags describe what the data is, the user of the data catalog can declaratively use a data query to retrieve all the data they want, and only the data they want regardless of how and where it is stored, such as shown in FIG. 2.

In an embodiment, process 115 creates protection policies 212 composed of one or more data queries that represent the data to be protected by that policy. The results from these queries, once the policy is run, are the datasets themselves. The actions one can perform on these datasets would be the same data protection operations performed on assets using present systems. These include backups, restores, migrations, archive, deletions, etc. The difference is that under present embodiments, the actions 214 are on specific sets of data 210 rather than specific assets (VMs, Databases, NAS shares, etc.).

In general, a protection policy defines at least: a data asset to be protected, the storage target, and the storage duration. Other relevant information might also be specified, such as backup type (backup, move, tier, restore, etc.), access privileges, and so on. One example policy might be "backup Asset or Asset set A comprising VMs, databases, specific folders on NAS 1 every day and store for 1 month, and replicate the data off-site after 2 weeks." For a database, a protection policy may be exemplified as: "backup this TAG or set of TAGs every day and store for 1 month, and replicate the dataset off-site after 2 weeks." These are provided for purposes of illustration only, and other expressions and examples of protection policies are also possible.

Figure 5:
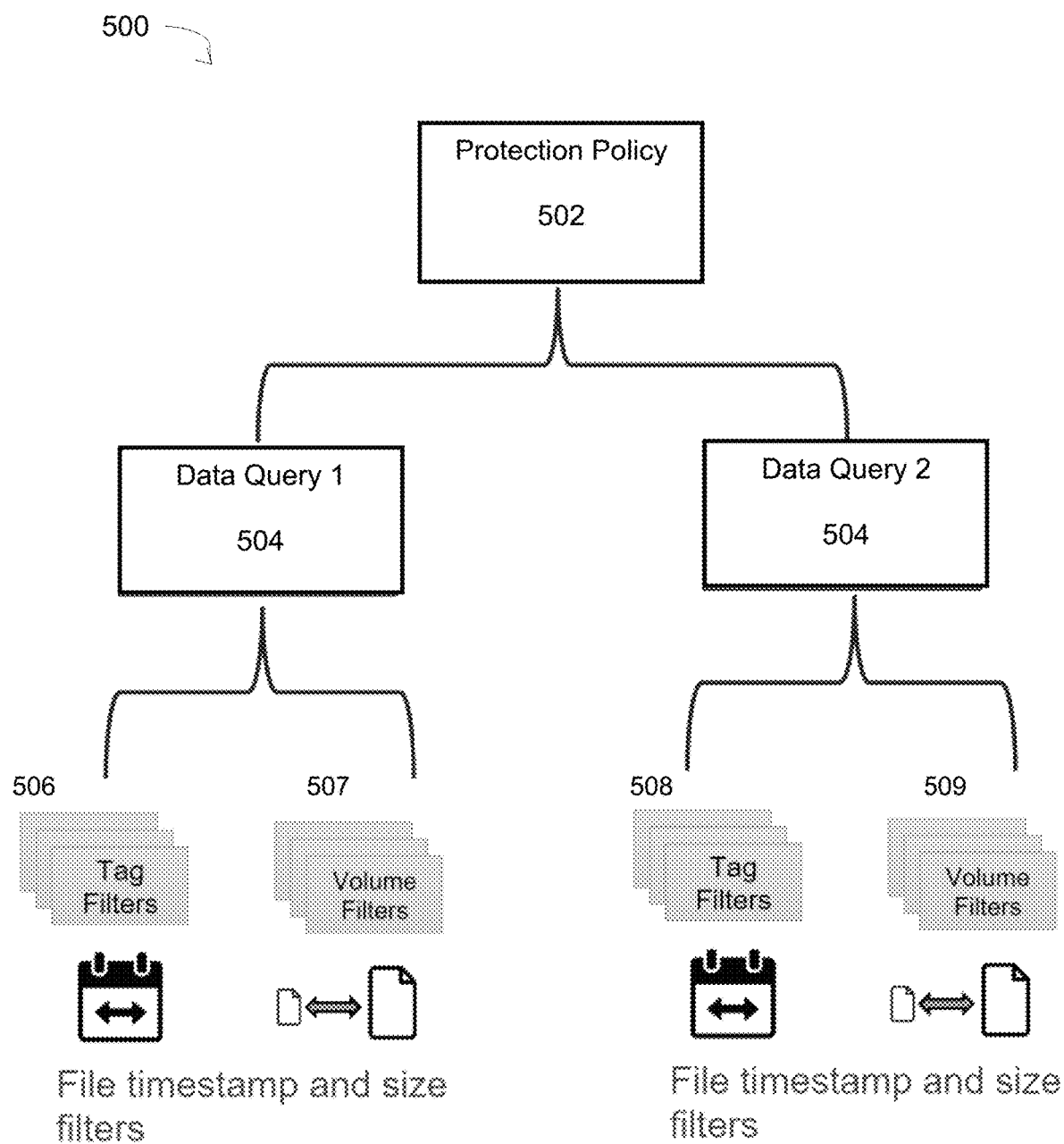
FIG. 5 illustrates protection policies composed of one or more data queries that find data in a data catalog based on file metadata, under some embodiments.

FIG. 5 illustrates protection policies composed of one or many data queries that find data in a data catalogs based off the files' metadata, under some embodiments. As shown in FIG. 5, system 500 includes a protection policy 502. The example of FIG. 5 includes two data queries as part of this protection policy, data query 1, 504, and data query 2, 506, which are each unique as to a particular backup. The data queries access certain tag filters 506, 508 and volume filters 507, 509, as shown, where the filters process file timestamp and size filters.

Figure 6:
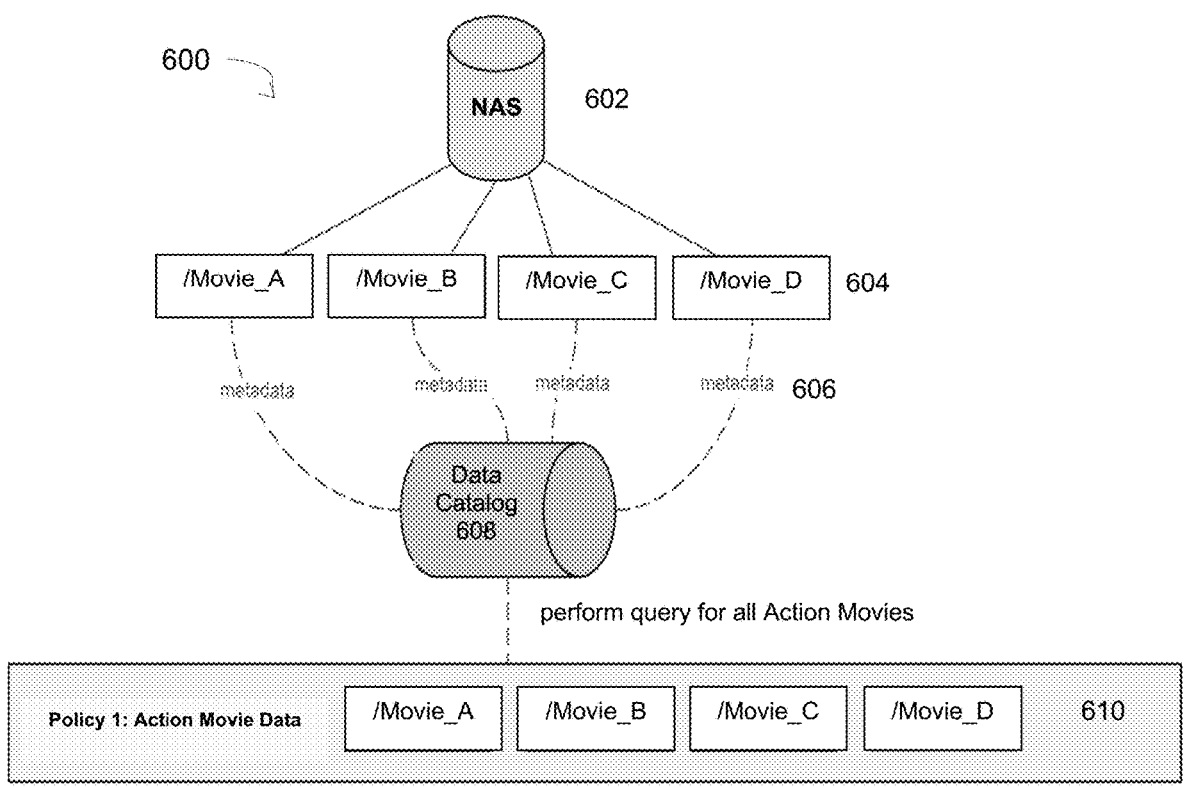
FIG. 6 illustrates an example of datasets and data catalogs used in data protection software, under some embodiments.

A shown in FIG. 4, the datasets are processed by a data catalog 406. FIG. 6 illustrates an example of datasets and data catalogs used in data protection software, under some embodiments. In this example, unstructured movie data is stored in a storage device, such as NAS 602. For this example, the user has defined a rule that tags specific assets (folders/files) with the tag "Action Movies" to denote that they are in the genre of action movies. For simplicity, the "Action Movie" tagging rule is applied if the word "Action Movie" is a prefix of a folder names, but any other tagging rule can also be used. If a user wanted to back up all of their Action movies 604 in their entire system (e.g., "Movie A", "Movie B", "Movie C", "Movie D", etc.) regardless of where or how they are stored, they can do this by querying the data catalog 608 to get all movies tagged with "Action Movie." They do not need to know which filesystems, storage platforms, or folders hold the data. In this case, the data catalog 608 will find the appropriate data it since it has the tag metadata 606. The result of the data query is the dataset 610. The user can then perform operations defined in 'Policy 1' on the data referenced by this dataset, which in this case may be a backup operation, or any other appropriate data protection operation.

Embodiments of the dataset management process 115 leverage any data catalog and produces a change file list from a catalog that does not have one and improves the current protection policy design by moving away from protecting assets to a model where it uses the tags, metadata and filesystem attributes to create a dataset that will be used by data protection software to create protection policies. This results in a content-based data protection as opposed to location or asset based data protection. This is in marked contrast to present backup software that force users to backup assets versus protecting data.

Figure 7:
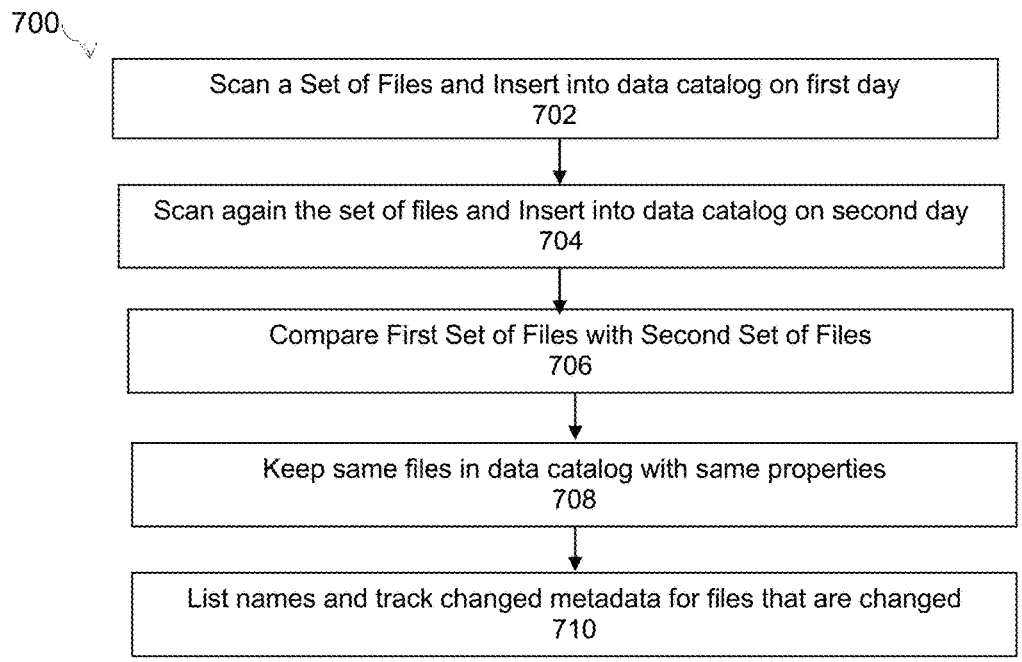
FIG. 7 is a flowchart that illustrates a method of tracking changes in a change file list, under some embodiments.

In an embodiment, a change file list stores names of files that have been changed from one scan period to the next scan period. FIG. 7 is a flowchart that illustrates a method of tracking changes in a change file list, under some embodiments. As shown in FIG. 7, process 700 begins with scanning a set of files on a first day (or other unit of time), 702, and scanning a the set of files again on the second day (or next defined period), 704, and storing metadata for each respect scanned set in a data catalog. For example, on day 0, the system scans 1,000 files and insert them into the data catalog, and on Day 1, it again scans the 1,000 files. In the step 706, the two sets of scans are compared with one another, so that in the example, the system compares the 1,000 files scanned on the day 1 to what was recorded in the data catalog on day 0. Files that remain the same between the two days will appear in the data catalog and have all the same properties on the second day, 708. Files that have been updated or modified will have similar items in the catalog but with a few metadata fields changed (e.g., file size, time stamp, etc.), and these are tracked and the name of the changed files are stored in the change file list. Files that are deleted will be items that existed in day 0 in the catalog, but when scanned for them on day 1 they do not appear on the storage devices (e.g., NAS, object storage, etc.).

In an embodiment, process 115 works on two types of datasets, dynamic and static datasets. Dynamic datasets are datasets where the number of items within a dataset can change at point in time. These are used in process 115 (such as through DataIQ) and are generated upon each query to the data catalog 406. Performing the same query 404 might lead to different results within the dataset. Static datasets comprise a fixed amount of data, i.e., datasets where the number of items, location of the items and lifecycle of the items do not change. The underlying data and its corresponding dataset entries remain intact and cannot be modified once created. The intersection of dynamic and static datasets (common dataset properties) comprises a collection of metadata information of unstructured data.

Figure 8A:
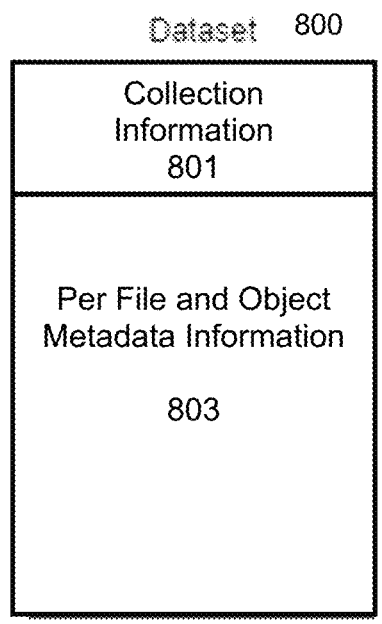
FIG. 8A illustrates the constitution of a dataset, under some embodiments.

Each dataset is collection of metadata information of the files and objects therein. FIG. 8A illustrates the constitution of a dataset, under some embodiments. As shown in FIG. 8A, the dataset 800 comprises metadata information that is broken up to two parts: collection information 801, and per file and object metadata information, 803.

The dataset collection information 801 is metadata information about the dataset as a whole and not information about any individual file or object. The purpose of section is to store items such as: dataset creation time, the query that produced the dataset, Role Based Access Control (RBAC) or Access Control List (ACL) rules on the dataset, and any additional free form metadata that can be added to the dataset. The size and scope of this metadata is generally small in comparison to the per file and object information. The dataset collection information can be considered as the metadata of the metadata.

The per file and object information 803 comprises metadata information on each of the files and objects that make up the dataset. Some examples include: the URI to the location of where the data exists, unstructured metadata information (stat record, ACLs, etc.), and any additional free form metadata information supplied by the system or user.

Figure 8B:
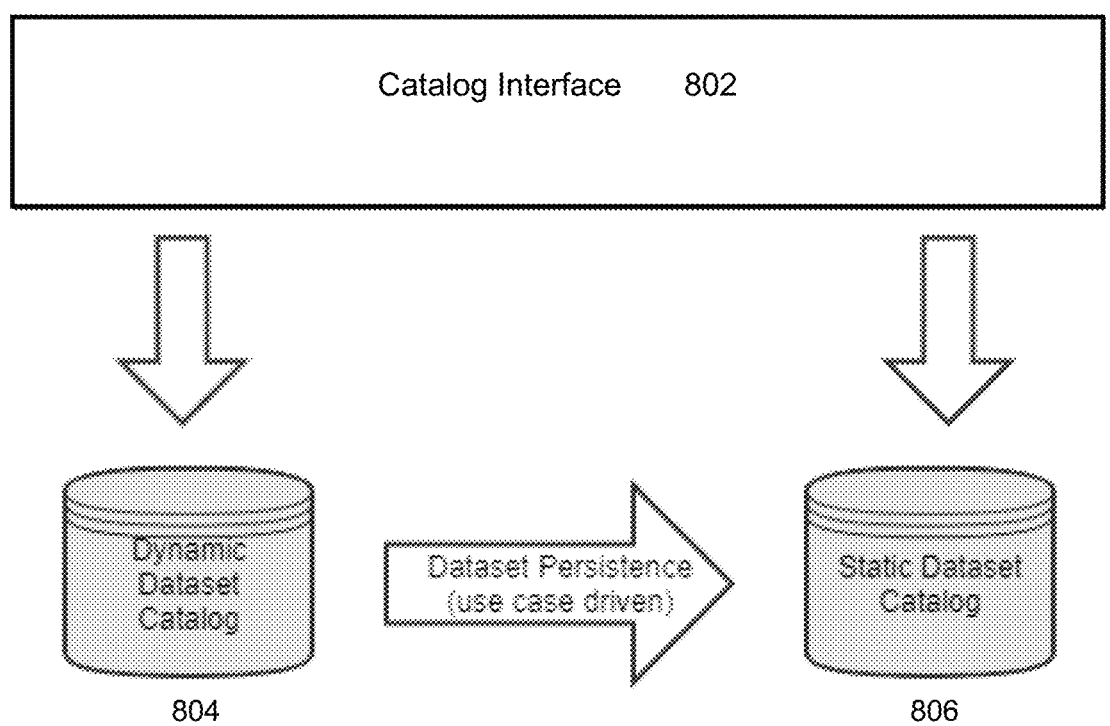
FIG. 8B illustrates a catalog storing information making up a dataset, under some embodiments.

As shown in FIG. 4, in order to be able to create and use datasets, the information that making up a dataset is stored in a catalog 408. FIG. 8B illustrates a catalog storing information making up a dataset, under some embodiments. As shown in FIG. 8B, there are two catalogs under a single catalog interface 802, namely the dynamic dataset catalog 804 and the static dataset catalog 806.

The dynamic dataset catalog 804 is information about the user environments that can help produce the information required to create a dataset. The dynamic dataset catalog is part of a larger system and pipeline within the user environment such as ingesting new data. The dynamic dataset catalog can also sever other use cases for users. It is assumed that the dynamic dataset catalog is latency close to the source of the data. For example, within the same network as a PowerScale or object storage device. There can be multiple instances of the dynamic dataset catalog within a user environment.

The static dataset catalog 806 is where persistent datasets are created and stored. The information in this catalog is the same as the dynamic dataset catalog but designed so that any operation performed on a dataset is done consistently. The static dataset catalog does not necessarily have to be latency close to the data and the size of scope of this will be much different from the dynamic dataset catalog. Static dataset catalogs are use case driven.

Persistent datasets are datasets in which the data within the catalog will not change, that is, update operations are not expected to happen because the data is static, and only READ operations to perform queries are expected. Other operations might include DELETE operations to remove static datasets at some point, or INSERT operations to create new static datasets, but UPDATE operations are much less common. For example, an admin may need to give access to the static dataset to more or less people so they can update the RBAC/ACL permissions on that static dataset.

FIG. 9 is a flowchart illustrating a method of managing datasets lifecycles, under some embodiments. As shown in FIG. 9, process 900 begins with defining a protection policy to protect certain data stored in different storage devices and/or network environments, 902. For example, a protection policy could be defined to backup all X-ray data from a clinic regardless of where and how it is stored, or to archive all NAS data to the cloud, and so on. The process gathers all of the metadata of data objects to be protected, such as using DataIQ or similar process, 904. The gathered metadata is stored in a catalog, 906. A user entered query is then run against the catalog to generate a dataset, 908. The query comprises metadata selectors as tags for matching against the cataloged metadata. The response to the query comprises the dataset, and the defined protection policy (from 902) is then applied to the dataset to protect or otherwise operate on the corresponding content data, 910.

In an embodiment, the dataset management process implements a semi file structure aware mechanism. Large systems may have user content placed in non-native formats for files, objects, data elements, and so on. For example, data content of a certain type (e.g., .xls spreadsheet data) may be placed in tar, zip or other archive file formats. As a result, this content is hidden from plain view and may be mismanaged.

Figure 10:
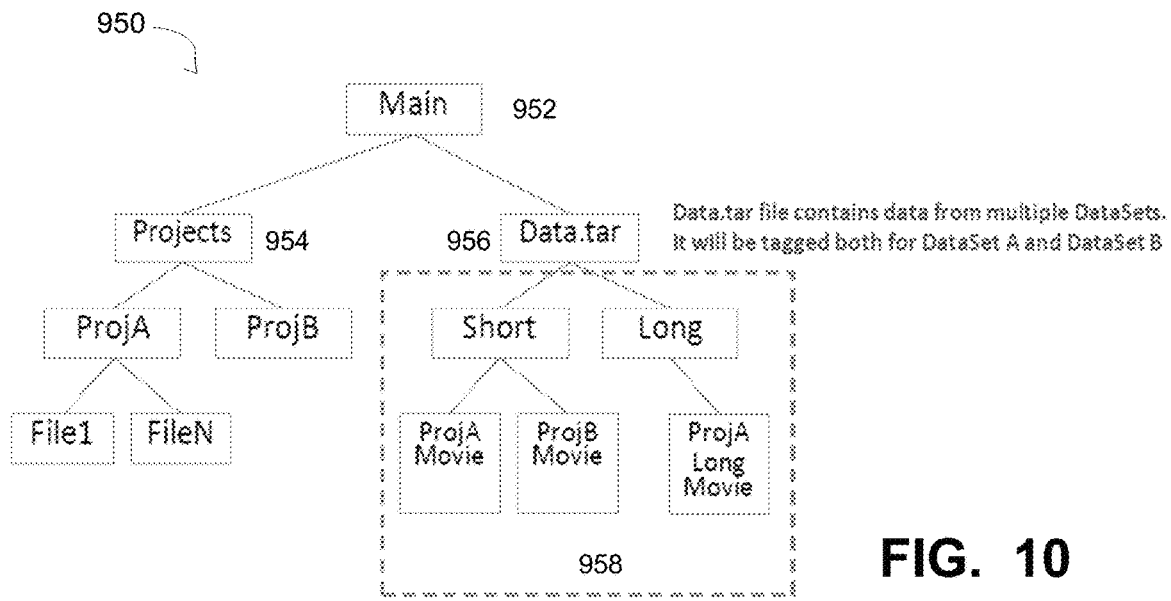
FIG. 10 illustrates an example of semi structure-aware datasets, under some embodiments.

FIG. 10 illustrates an example of semi structure aware datasets, under some embodiments. As shown in FIG. 10, an overall filesystem 950 may include a main directory 952, which in turn holds directories for projects and archived data (.tar files). The projects directory 954 contains two directories 'ProjA' and ProjB'. The ProjA data will form dataset A and the ProjB data will form dataset B. The Data.tar directory 956 contains both ProjA and ProjB movie data 958, and therefore contains data from multiple datasets. Accordingly, it will be tagged with metadata for both dataset A and dataset B. Thus, these datasets have metadata that references both regular content data (under 'Projects') and archived data (under 'Data.tar').

Figure 11:
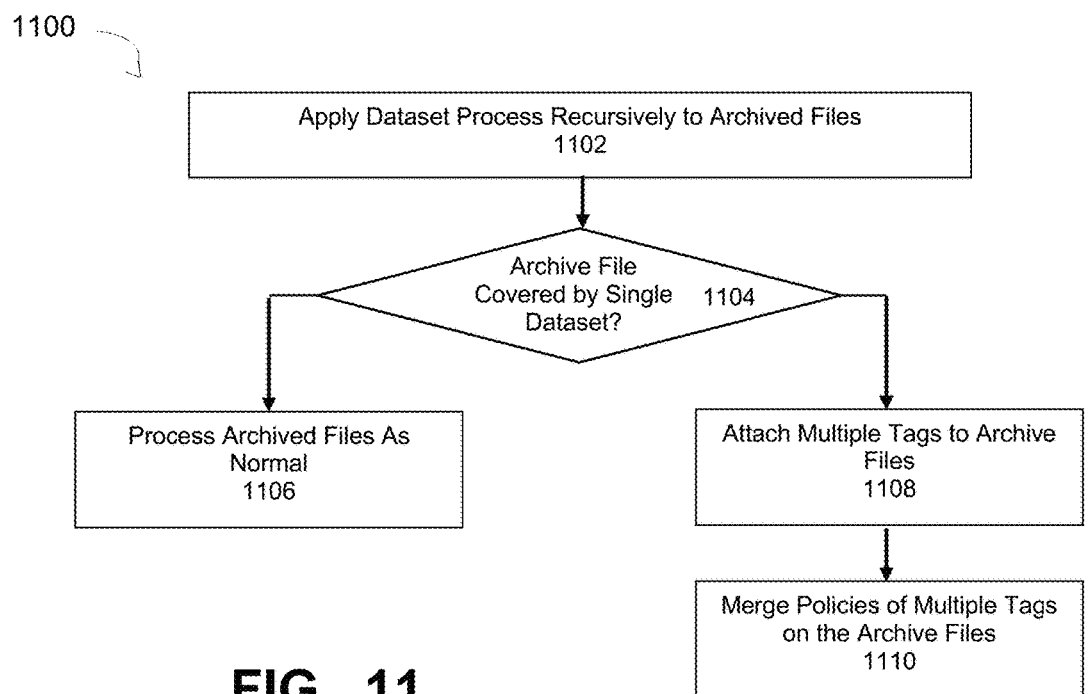
FIG. 11 is a flowchart illustrating a method of applying dataset processing to disparate file format datasets, under some embodiments.

FIG. 11 is a flowchart illustrating a method of applying dataset processing to disparate file format datasets, under some embodiments. This process 1100 applies the dataset process 115 recursively to contents of archive or similar files, 1102. If all of the contents in an archive file is consistent with a single dataset classification, as determined in step 1104, then the process treats the archived files as simply another type of storage, and the metadata tagging and dataset generation proceeds as shown in FIG. 9, step 1106.

However, if the contents of the archive classifies into multiple datasets, the process tracks and tags the contents of the archive as if they were stored in native format. Multiple tags are attached to the archive files, 1108. The multiple tags reflect the fact that data that is archived usually comprises files of different types. For example, data stored in a compressed/archived format (e.g., tar, zip, rar, etc.) can have files in the archive tagged as 'office documents' from applications such as MS-Word, Excel, PowerPoint, etc., while other may be audio visual image files (e.g., jpg, png, bmp, etc.) and be tagged as 'images.'

The process then merges the policies of all the tags on the archive file, 1110. This can be done according to the most restrictive policy. However, other options are also possible. For example, if dataset A has a data protection policy that requires daily backups and dataset B requires hourly backups, the process does hourly backups on the archive file. This evaluation can be made for every parameter separately. Process 1100 thus applies policies and other management operations even on archive files based on the archive content.

As shown in FIG. 8B, datasets can be characterized as dynamic datasets or static datasets. Static datasets are datasets that are fixed in size and cannot be modified. Such datasets are useful for data that is to be retained according to strict retention rules, such as documents placed in legal hold discovery, certain medical or sensitive business data, top secret information, and so on.

Figure 12:
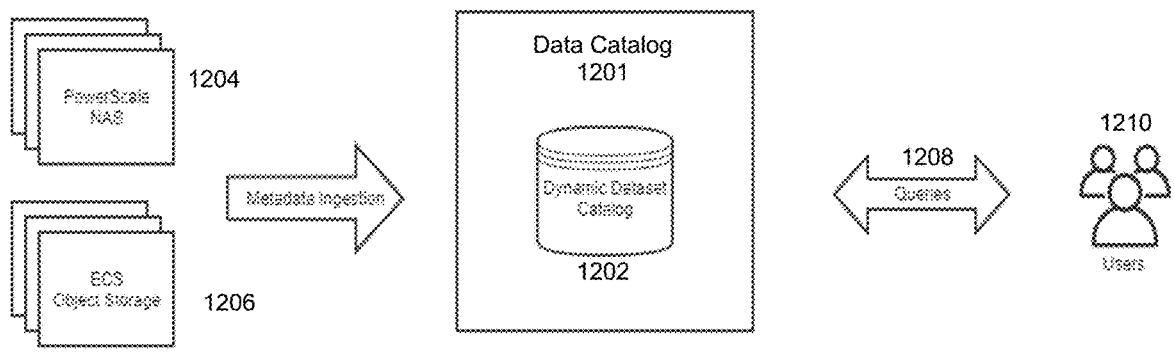
FIG. 12 illustrates a dynamic dataset processing user queries, under some embodiments.

Dynamic datasets are datasets wherein the items and/or characteristics of these items can change over time, and a dynamic dataset catalog is often used when a user environment is ingesting new data. For example, dynamic datasets can be used by an IT organization to implement charge/show back processes to handle capacity and perform resource planning. FIG. 12 illustrates a dynamic dataset processing user queries, under some embodiments. As shown in FIG. 12, a dynamic dataset catalog 1202 ingest metadata from different data stores, such as NAS 1204 and ECS 1206.

For this embodiment, a data mover process 1201 is setup to crawl and index multiple sources such as NAS and ECS, and the users 1210 of the system are then able to find all data related to a particular project, department, cost center, etc. through queries 1208, and then implement their own application models.

In the case of an IT chargeback/showback application, the dynamic datasets 1202 which are stored within data catalog 1201 will be able to help the user answer questions, such as: How much data project X using? Does their data usage match to the expected service? Are they using more or less data then anticipated? Projecting their rate of growth, can demand be met? What storage mediums are being used for project X? Is this the most cost effective medium? How active or cold is their data?, and so on.

An IT chargeback and IT showback are generally known as two policies used by information technology (IT) departments to allocate or bill the costs associated with each department's usage, so that appropriate money can be transferred from one group to another.

In this scenario, dynamic datasets are unaware of the type of questions/queries that users are asking of it, and this provides the ability for users to ask generic questions, and have user decisions based on the data that is produced by dynamic datasets, and provides flexibility to be integrated into new or existing workflows.

In an embodiment, a static dataset can be created from one or more dynamic datasets in response to queries input by a user to find the data they are looking for. For example, "find all files related to project X across my environment." These files can span multiple sources like NAS and object storage. The queries will produce a set of results that are dynamic datasets, and the user can then convert those dynamic dataset(s) into a static dataset.

Figure 13:
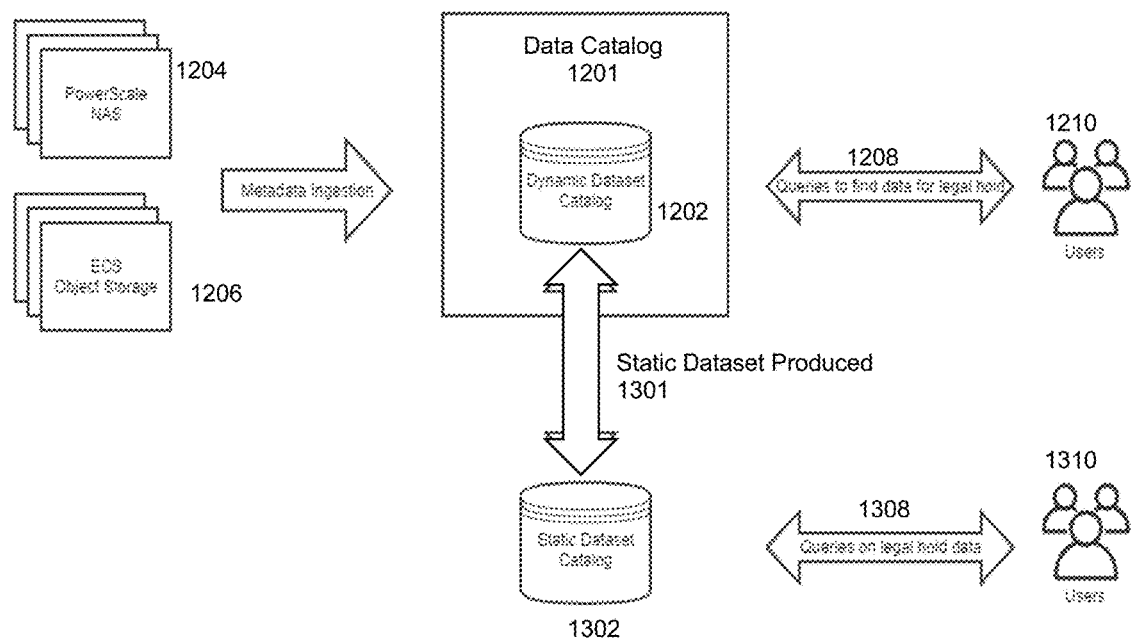
FIG. 13 illustrates the conversion of dynamic datasets into a static dataset, under some embodiments.

FIG. 13 illustrates the conversion of dynamic datasets into a static dataset, under some embodiments. As shown in FIG. 13, the dynamic dataset catalog 1202 in data catalog 1201 is queried by users 1210 to find data for all data stored in NAS 1204 and ECS 1206 for legal hold. Such data may be data tagged with the string "legal hold" or containing some other metadata indicating its status as a file to be retained under legal hold rules. The query 1208 in this example case is simply something like "find all data subject to legal hold." This query will then produce a dataset 1301, which is essentially static as of the moment it is generated by query 1208. This static dataset is then stored in static dataset catalog 1302. Being restricted and subject to strict non-modification rules, this data cannot be modified, deleted, added to, or any other such operation, and users 1310 can then make queries 1308 on the legal hold data, that does not impact the static nature of the dataset. 1301.

With respect to specific applications, a legal hold is a process that an organization uses to preserver potentially relevant information when litigation is pending or anticipated. Such a hold may be mandated by certain court rules (e.g., Federal Rules of Civil Procedure), and may be initiated by a notice from legal counsel to an organization that suspends the normal disposition or processing of records, such as backup tape recycling, archived media and other storage and management of documents and information. Legal holds may be issued as a result of litigation, audits, government investigations or other such matters to avoid spoliation of evidence, and can encompass business procedures affecting active data, including backup tape recycling.

Figure 14:
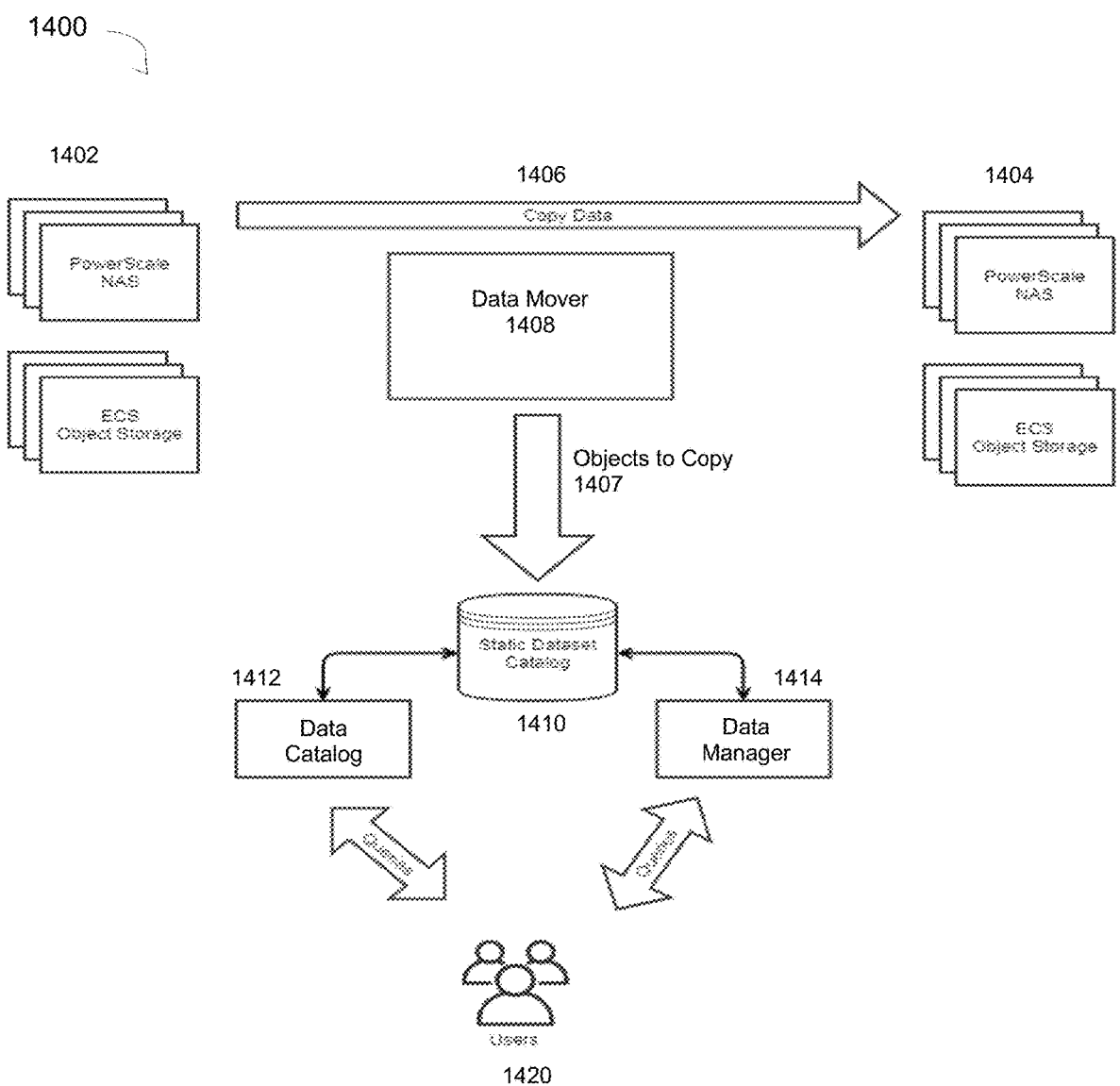
FIG. 14 illustrates a process of converting a dynamic dataset into a static dataset, under some embodiments.

FIG. 14 illustrates a process diagram for converting a dynamic dataset into a static dataset, under some embodiments. As shown in FIG. 14, the conversion process 1400 for converting to a static dataset includes copying 1406 the results of the dynamic dataset into the static dataset catalog 1410. The data is copied from a first storage system 1402 to another storage system 1404. The process adds an entry to the static dataset catalog 1410 to record the URI of the copied data 1407. A data mover 1408 could integrate with the static dataset and move the data as part of a workflow that is exposed in data catalog 1412 or data manager 1414. Users 1420 can then query the static dataset catalog 1410 through these interfaces. The data mover 1408 may comprise any process or component that effects movement of a data element, such as a copy command, sync command, backup agent, and the like.

Encryption Key Management Using Datasets

As stated in the Background, a drawback of present key-based encryption schemes is that they require data to be encrypted using the same key, whereas using different keys for different sets of data and with different key rotation polices and lifecycles would be more beneficial.

Encryption is generally known as a process of encoding data based on an encryption or cryptographic key. Such a key typically comprises a string of characters used within an encryption algorithm for altering data so that it appears random (i.e., cipher text). For encryption algorithms, a key specifies the transformation of plain text into cipher text, and vice versa for decryption algorithms. Once data has been encrypted, it cannot be read or used without having an appropriate key to decrypt the data.

Encryption standards used in encryption process 125 may be based on the Advanced Encryption Standard (AES) that uses encrypts blocks of data of size 128, 192, or 256 blocks, or other standards such as RSA (which uses public keys for encryption), or Triple Data Encryption Standard (3DES), and others. Any appropriate encryption standard or process may be used, however. It should be noted that the encryption/decryption module or process 125 exists either as a native part of the filesystem/storage or as an external component. Any appropriate encryption mechanism or process may be used, and such a process utilizes the dataset key management process 117 in addition to any other key management system, such as KMS 127.

In general, encryption keys used for encrypting data at rest are rotated at cadence to ensure that large amounts of data are not dependent on a single encryption key, which creates the risk of a single point of failure when securing data at rest. In an embodiment, the system 100 may utilize a standard key management system (KMS) to perform key rotation and other key management functions that work with an encryption process 125 for performing standard encryption/decryption. In general data 'at rest' refers to data that is stored in persistent storage (e.g., hard disk) of an active storage tier as user data. Other types of data include cached data, and data in transit. The key management module 127 can also manage different key rotation workflows, such as for periodic rotation of keys or handling a case where a data encryption key is compromised.

Figure 15:
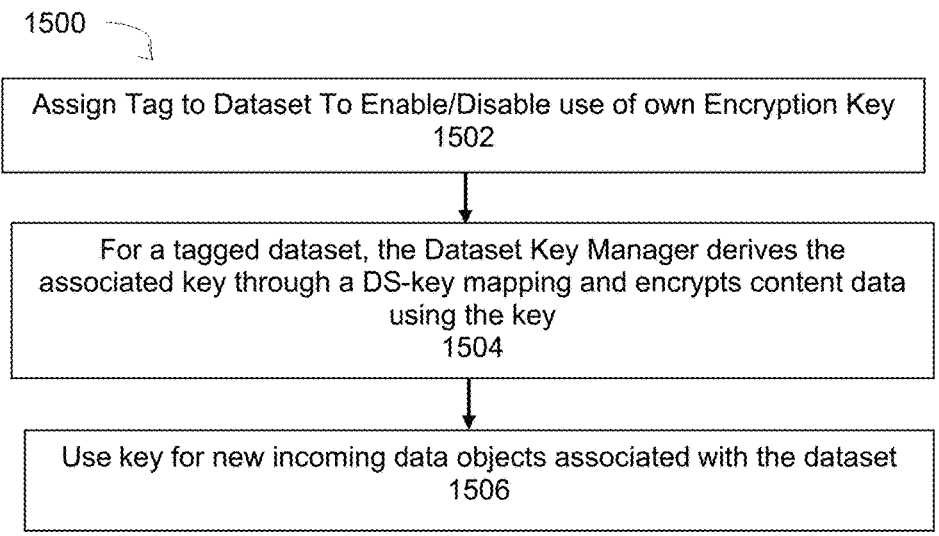
FIG. 15 is a flowchart that illustrates a method of providing encryption key management using content-based datasets, under some embodiments.

FIG. 15 is a flowchart that illustrates a method of providing encryption key management using content-based datasets, under some embodiments. In an embodiment, the dataset management process 115 of system 100 assigns a special tag, such as a key/value pair, to a dataset so that the dataset can enable or disable its own encryption key for encrypted content data referenced by the dataset, 1502.

When this key tag is present for a dataset, key manager 117, also referred to as the Dataset Key Management System (DSKMS), derives the associated encryption key and encrypts the content data objects according to a policy or policies set by the user, 1504. In an embodiment, the key derivation may be performed through a dataset-to-key mapping (DS→key) that associates a dataset to a specific encryption key or keys stored in or made available to the system.

New data objects will be classified to a dataset as they are introduced to the system, and the matching encryption key will be applied automatically based on the dataset to which they are associated, 1506. Keys may be stored internally by the DSKMS 117 or stored in a standard KMS 127 that may be used by the system.

The key tag assigned in step 1502 may be any alphanumeric label or identifier that uniquely identifies keys used by the KMS 127 in the system.

Through process 1500, each dataset (or subset of datasets) may have its own encryption key. These keys may be of different key strengths or encryption types from one another. For example, more sensitive data may utilize stronger encryption techniques, which is typically more resource-intensive, but more secure. There may also be multiple keys associated to a single dataset if needed for configuration reasons, such as specific platform requirements. For example, a filesystem may support a key of type X, while an object store supports only key of type Y, and both may be associated to items in the same dataset, but use different encryption keys based on their content type (or any other feature or attribute).

Figure 16:
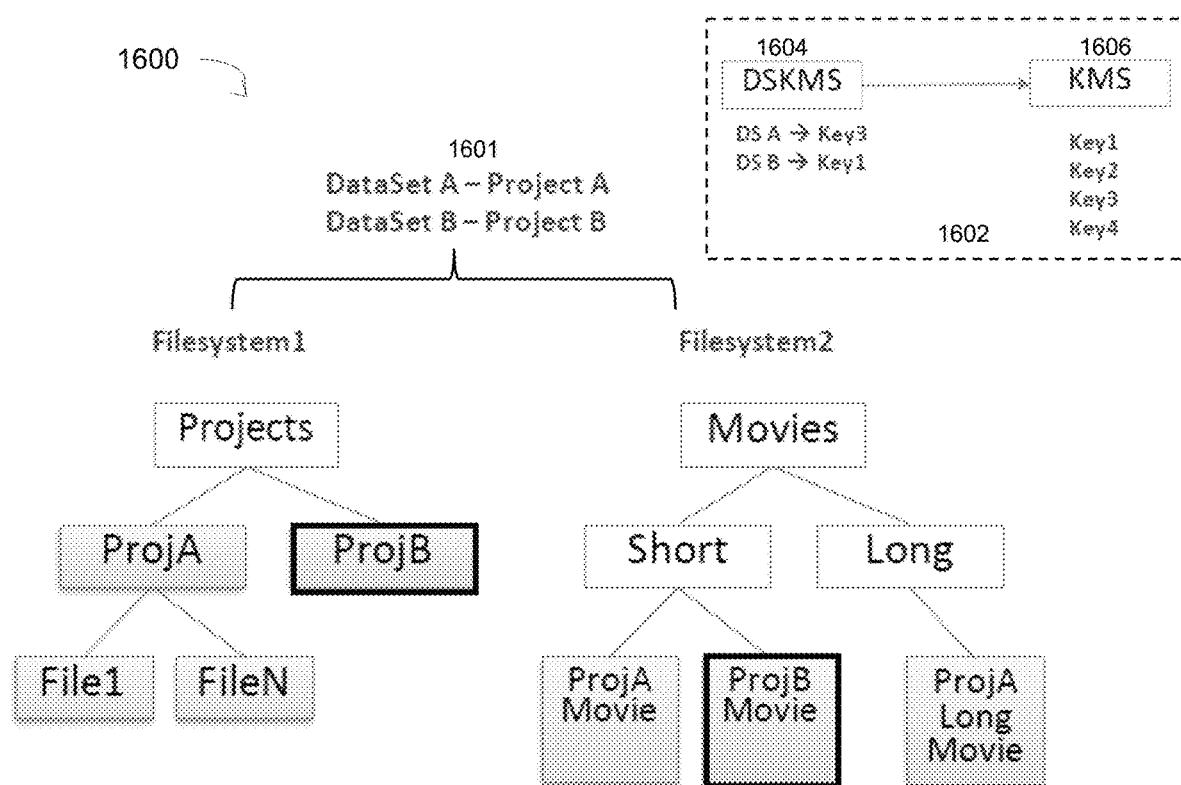
FIG. 16 illustrates a key management system using content-based datasets in applied to example filesystems, under an example embodiment.

FIG. 16 illustrates a key management system using content-based datasets applied to example filesystems, under an example embodiment. Diagram 1600 illustrates a directory structure having two file systems, Filesystem1 and Filesystem2, each having directories and sub-directories holding various data object files, such as project files, movies, and so on. For the example of FIG. 16, the dataset assignment legend 1601 shows that two datasets are generated, where DataSetA encompasses all project A (ProjA) files, and DataSetB encompasses all project B (ProjB) files. In the figure, the different data objects for the separate datasets are distinguished by the heavy borders around the ProjB data, and belonging to DataSetB.

In subsystem 1602, a key management system KMS 1606 stores keys used by the encryption process (e.g., 125) to encrypt the data in the system. Any number of keys may be stored in the KMS. Instead of assigning the same key to all datasets, however, the DSKMS process using content-based datasets allows different datasets to use different keys. The dataset key management system, DSKMS 1604 manages the per dataset key mapping where different datasets may be mapped to one or more different keys stored in the KMS 1606. For the example shown, DSKMS 1604 maps DataSetA to key 3, and it maps DataSetB to key 1.

Although FIG. 16 illustrates an embodiment in which the KMS 1606 stores all of the available keys, embodiments are not so limited. DSKMS 1604 can also be used to store all or part of the available keys. Alternatively, the keys can be provided by an external key provider service, in which case, these keys are made known to the DSKMS so that it may perform the appropriate mapping.

Embodiments of system 100 thus create a unique content-based key management scheme where the nature of the data derives the key to use for encryption, and wherein different datasets can utilize different encryption keys for a common overall set of content data. The dataset groups the content data together based on the encryption key to use, regardless of where the data is located, and a mapping scheme associates each dataset to a selected key or keys.

As described above, in an embodiment, system 100 include certain processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 17:
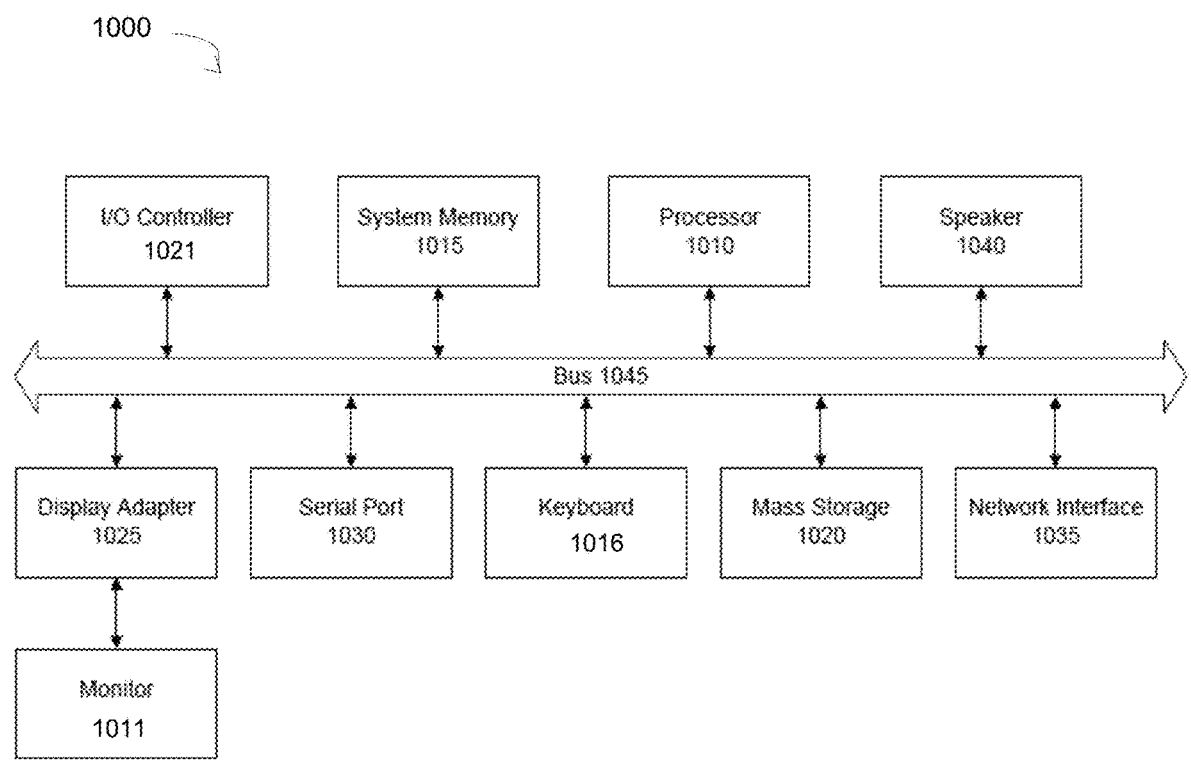
FIG. 17 is a block diagram of a computer system used to execute one or more software components of a system for content-based dataset management, under some embodiments.

FIG. 17 is a block diagram of a computer system used to execute one or more software components of a system for content-based dataset management, under some embodiments. The computer system 1000 includes a monitor 1011, keyboard 1016, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 4 is an example of a computer system suitable for use with the present system.

Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing content-based encryption to content data having disparate file formats in a data processing system, comprising:
    defining protection policies to protect the content data using different protection policies depending on a respective file format;
    creating datasets by grouping metadata for data objects that are intended to be encrypted with a common encryption key, wherein each dataset spans multiple storage devices of different storage types for the respective file format, and wherein each dataset defines a single data encryption unit for the data objects referenced by a respective dataset;
    iteratively processing each dataset to tag constituent data objects according to a native file format;
    attaching multiple tags to the dataset to indicate that the data objects of the dataset are of different file types according to the disparate file formats;
    merging the protection policies to protect the dataset under a merged protection policy utilizing a most restrictive policy of the different protection policies;
    further tagging each dataset with an encryption tag to enable or disable use of a self-selected encryption key;
    accessing encryption keys stored in or made available to the system for encrypting the data objects using an encryption process;
    mapping each dataset to a corresponding encryption key of the encryption keys; and
    encrypting, for each dataset, referenced data objects using a corresponding mapped encryption key.

2. The method of claim 1 wherein the dataset comprises a set of metadata organized in a table, and wherein the encryption tag comprises an alphanumeric label appended to the table, and further wherein the method further comprises applying the merged protection policy to the dataset to protect or otherwise operate on the constituent data objects referenced by the metadata.

3. The method of claim 1 further comprising:
    processing new data objects received by the system;
    assigning, to an assigned dataset, each new data object based on an encryption requirement; and
    applying an encryption key mapped to the assigned dataset to the assigned new data objects.

4. The method of claim 1 wherein the accessing step comprises accessing one or more encryption keys from a local key manager memory store, a remote network key manager store, or a key provisioning service.

5. The method of claim 1 wherein the encryption key mapped to the dataset comprises a plurality of keys mapped to different data objects referenced by the dataset, and wherein the each key of the plurality of keys for the dataset applies a different encryption strength or encryption type.

6. The method of claim 1 wherein the common encryption key is generated by an encryption policy specifying a key rotation schedule that rotates keys at cadence to encrypt data at rest comprising user data stored in persistent storage of an active storage tier.

7. The method of claim 1 wherein the encryption process uses the corresponding mapped encryption key to transform plain text of the data object into cipher text for an encryption operation, and to transform the cipher text into the plain text for a decryption operation.

8. The method of claim 7 wherein the encryption and decryption operations utilize an encryption standard comprising one of: Advanced Encryption Standard (AES), RSA, or Triple Data Encryption Standard (3DES).

9. A system for providing content-based encryption to content data having disparate file formats and organized as datasets in a data processing system, comprising:
   a data protection component defining protection policies to protect the content data using different protection policies depending on a respective file format, iteratively processing each dataset to tag constituent data objects according to a native file format, attaching multiple tags to the dataset to indicate that the data objects of the dataset are of different file types according to the disparate file formats, and merging the protection policies to protect the dataset under a merged protection policy utilizing a most restrictive policy of the different protection policies;
   a hardware-based dataset management component creating the datasets by grouping metadata for data objects that are intended to be encrypted with a common encryption key, wherein each dataset spans multiple storage devices of different storage types, and wherein each dataset defines a single data encryption unit for the data objects referenced by a respective dataset;
   a dataset key management system (DSKMS) component further tagging each dataset with an encryption tag to enable or disable use of a self-selected encryption key, accessing encryption keys stored in or made available to the system for encrypting the data objects using an encryption process, and mapping each dataset to a corresponding encryption key of the encryption keys; and
   an encryption processing component encrypting, for each dataset, referenced data objects using a corresponding mapped encryption key.

10. The system of claim 9 wherein the dataset comprises a set of metadata organized in a table, and wherein the encryption tag comprises an alphanumeric label appended to the table and further wherein the data protection component further applies the merged protection policy to the dataset to protect or otherwise operate on the constituent data objects referenced by the metadata.

11. The system of claim 9 wherein the DSKMS further processes new data objects received by the system; assigns, to an assigned dataset, each new data object based on an encryption requirement; and applies an encryption key mapped to the assigned dataset to the assigned new data objects.

12. The system of claim 9 wherein the DSKMS accesses one or more encryption keys from a local key manager memory store, a remote network key manager store, or a key provisioning service.

13. The system of claim 9 wherein the encryption key mapped to the dataset comprises a plurality of keys mapped to different data objects referenced by the dataset, and wherein the each key of the plurality of keys for the dataset applies a different encryption strength or encryption type.

14. The system of claim 9 wherein the common encryption key is generated by an encryption policy specifying a key rotation schedule that rotates keys at cadence to encrypt data at rest comprising user data stored in persistent storage of an active storage tier.

15. The system of claim 9 wherein the encryption process uses the corresponding mapped encryption key to transform plain text of the data object into cipher text for an encryption operation, and to transform the cipher text into the plain text for a decryption operation.

16. The system of claim 15 wherein the encryption and decryption operations utilize an encryption standard comprising one of: Advanced Encryption Standard (AES), RSA, or Triple Data Encryption Standard (3DES).

17. A non-transitory tangible computer program product having stored thereon, programming code that, when executed by a processor, causes the processor to perform a method of providing content-based encryption to content data having disparate file formats in a data processing system, comprising:
   defining protection policies to protect the content data using different protection policies depending on a respective file format;
   creating datasets by grouping metadata for data objects that are intended to be encrypted with a common encryption key, wherein each dataset spans multiple storage devices of different storage types for the respective file format, and wherein each dataset defines a single data encryption unit for the data objects referenced by a respective dataset;
   iteratively processing each dataset to tag constituent data objects according to a native file format;
   attaching multiple tags to the dataset to indicate that the data objects of the dataset are of different file types according to the disparate file formats;
   merging the protection policies to protect the dataset under a merged protection policy utilizing a most restrictive policy of the different protection policies;
   further tagging each dataset with an encryption tag to enable or disable use of a self-selected encryption key;
   accessing encryption keys stored in or made available to the system for encrypting the data objects using an encryption process;
   mapping each dataset to a corresponding encryption key of the encryption keys; and
   encrypting, for each dataset, referenced data objects using a corresponding mapped encryption key.

18. The non-transitory computer program product of claim 17 wherein the dataset comprises a set of metadata organized in a table, and wherein the encryption tag comprises an alphanumeric label appended to the table, and further wherein the method further comprises applying the merged protection policy to the dataset to protect or otherwise operate on the constituent data objects referenced by the metadata.

19. The non-transitory computer program product of claim 17 wherein the method further comprises:
   processing new data objects received by the system;
   assigning, to an assigned dataset, each new data object based on an encryption requirement; and
   applying an encryption key mapped to the assigned dataset to the assigned new data objects.

20. The non-transitory computer program product of claim 17 wherein the accessing step comprises accessing one or more encryption keys from a local key manager memory store, a remote network key manager store, or a key provisioning service.

* * * * *